US011249310B1

United States Patent
Kitain et al.

(10) Patent No.: US 11,249,310 B1
(45) Date of Patent: Feb. 15, 2022

(54) AUGMENTED REALITY DEVICE WITH EXTERNAL LIGHT CONTROL LAYER FOR REALTIME CONTRAST CONTROL

(71) Applicant: Lockheed Martin Corporation, Bethesda, MD (US)

(72) Inventors: Joshua D. Kitain, Orlando, FL (US); Gregory A. Harrison, Oviedo, FL (US); William J. Headrick, Oviedo, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/200,087

(22) Filed: Nov. 26, 2018

(51) Int. Cl.
*G02B 27/01* (2006.01)
*G01J 1/42* (2006.01)
*G02F 1/163* (2006.01)

(52) U.S. Cl.
CPC ........ *G02B 27/0172* (2013.01); *G01J 1/4204* (2013.01); *G02F 1/163* (2013.01)

(58) Field of Classification Search
USPC .......................................................... 345/8
See application file for complete search history.

(56) References Cited

U.S. PATENT DOCUMENTS

| 8,625,200 | B2  |   | 1/2014  | Smith et al. |             |
|-----------|-----|---|---------|--------------|-------------|
| 8,781,794 | B2  |   | 7/2014  | Harrison et al. |          |
| 2012/0001833 | A1 | * | 1/2012 | Lindig ................ | G02B 27/017 |
|           |     |   |         |              | 345/8 |
| 2012/0249797 | A1 | * | 10/2012 | Haddick ................ | G06F 3/016 |
|           |     |   |         |              | 348/158 |
| 2013/0057937 | A1 | * | 3/2013 | Berman .................... | E06B 9/68 |
|           |     |   |         |              | 359/230 |
| 2013/0127980 | A1 | * | 5/2013 | Haddick ............ | G02B 27/0093 |
|           |     |   |         |              | 348/14.08 |
| 2016/0033772 | A1 | * | 2/2016 | Han ...................... | H04N 1/6083 |
|           |     |   |         |              | 359/630 |
| 2017/0293356 | A1 | * | 10/2017 | Khaderi ................ | A63F 13/212 |
| 2018/0314066 | A1 | * | 11/2018 | Bell ......................... | G09G 5/10 |
| 2019/0227347 | A1 | * | 7/2019 | Jimenez ................... | G02C 1/06 |

\* cited by examiner

*Primary Examiner* — Sahlu Okebato
(74) *Attorney, Agent, or Firm* — Foley & Lardner LLP

(57) ABSTRACT

An augmented reality device. The device includes an integrated lens system having a field of view (FOV). The lens system includes a reflective layer, a transparent substrate layer, an external light control layer, and an anti-reflective layer. The device also includes a display device configured to present an image on an interior surface of the integrated lens system.

13 Claims, 9 Drawing Sheets

AUGMENTED REALITY DEVICE WITH EXTERNAL LIGHT CONTROL LAYER FOR REALTIME CONTRAST CONTROL

TECHNICAL FIELD

The examples relate generally to augmented reality devices, and in particular to an augmented reality device with an external light control layer for realtime contrast control.

BACKGROUND

In an optical see-through augmented reality (AR) head-wearable device, it is desirable to have an appropriate balance of external light from a real-world scene versus internal light associated with the AR imagery. For example, if the external light is substantially brighter than the internal light, then the AR imagery may appear washed out or may not even be visible. If the internal light is much brighter than the external light, then the real-world scene may be difficult to see, and excess light may escape from the head-wearable device, allowing the user to be seen by other individuals in situations where it may be desirable to keep light emissions low, such as in a tactical situation.

SUMMARY

The embodiments disclosed herein relate to an augmented reality (AR) device with an external light control layer, such as a photochromic or electrophotochromic layer, for realtime contrast control. The embodiments ensure that computer-generated AR imagery is easily visible to a user even as the user transitions from dark to bright areas of the real world, such as when moving from an outdoor scene on a bright day to an interior of a dark building, and ensure that the internal light associated with computer-generated AR imagery is not overly bright with respect to the external light from the scene.

In one embodiment a device is provided. The device includes an integrated lens system having a field of view (FOV). The integrated lens system includes a reflective layer, a transparent substrate layer, an external light control layer, and an anti-reflective layer. The device also includes a display device configured to present an image on an interior surface of the integrated lens system.

In another embodiment another device is provided. The device includes an integrated lens system having an FOV. The integrated lens system includes a reflective layer, a transparent substrate layer, an electrophotochromic layer, and an anti-reflective layer. The device also includes a display device configured to present an image on an interior surface of the integrated lens system. The device further includes a light sensor configured to generate an external light power level that quantifies an amount of light received from a scene within the FOV. The device further includes a controller communicatively coupled to the electrophotochromic layer and the display device.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

The embodiments disclosed herein relate to an augmented reality (AR) device with an external light control layer for realtime contrast control. In some embodiments the external light control layer comprises a photochromic layer. In other embodiments the external light control layer comprises an electrophotochromic layer. The embodiments ensure that computer-generated AR imagery is easily visible to a user even as the user transitions from dark to bright areas of the real world, such as when moving from an outdoor scene on a bright day to an interior of a dark building, and ensures that the internal light associated with computer-generated AR imagery is not overly bright with respect to the external light from the scene.

Figure 1:
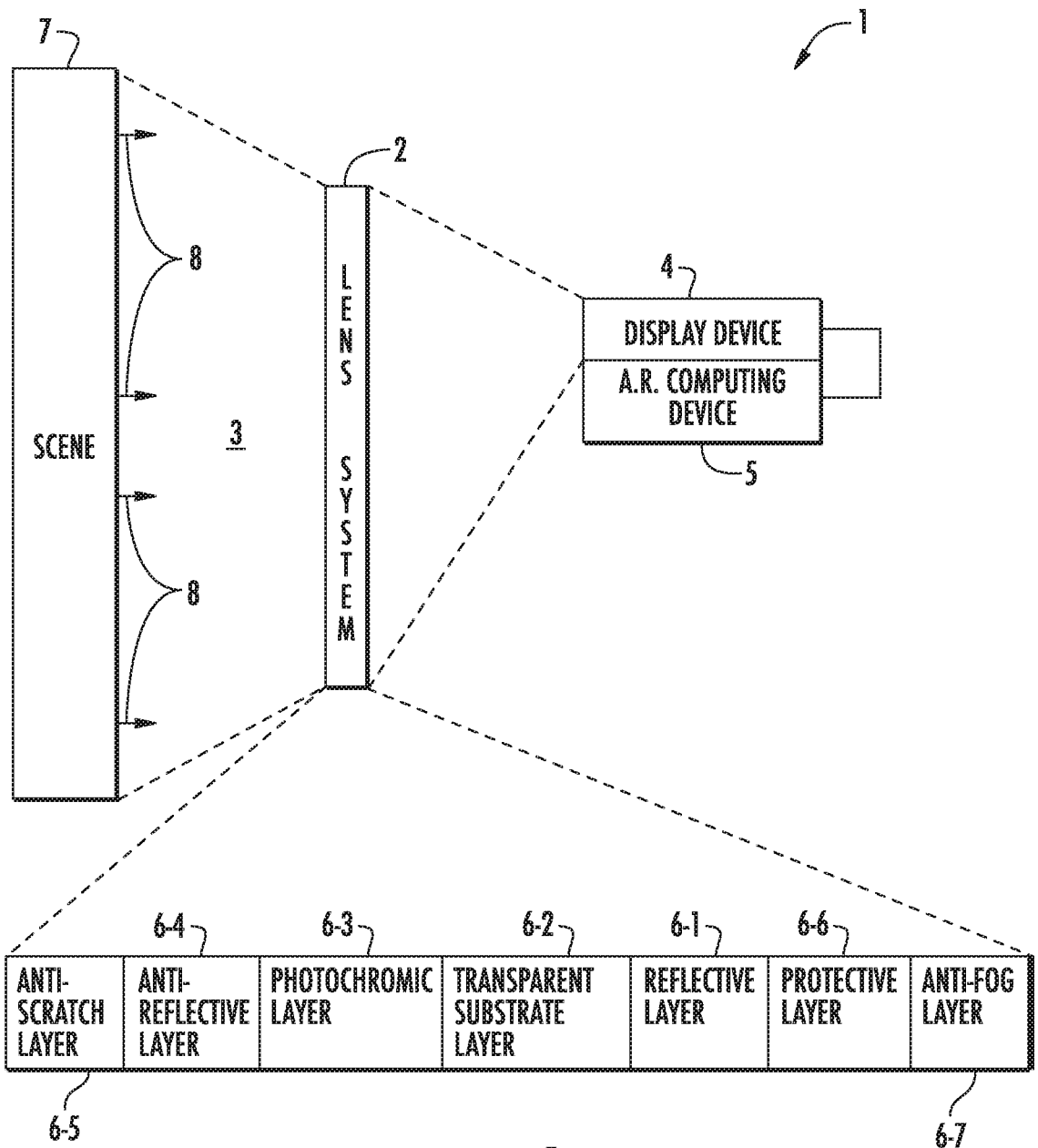
FIG. 1 is a block diagram of an augmented reality (AR) head-wearable device according to one embodiment.

FIG. 1 is a block diagram of an AR device 1 according to one embodiment. The AR device 1 includes an integrated lens system 2 that has a field of view (FOV) 3, and a display device 4 that is configured to present an image generated by an AR computing device 5 on an interior surface of the integrated lens system 2. The AR computing device 5 may physically be part of the AR device 1 or may be remote from the AR device 1 and may communicate with the display device 4 via a communications medium, such as a Wi-Fi communications medium or the like.

The AR device 1 may also include a frame structure (not illustrated in FIG. 1) that can be placed on the head of a user, such as one or more adjustable straps, or may include a frame structure that can be coupled to another device, such as a helmet. In some embodiments, the AR device 1 includes a frame structure that is configured to be coupled to a rail mount system of a helmet, such as a military or law enforcement helmet. The AR device 1 can be utilized for any number of different applications, including, by way of non-limited example, training or real-life tactical situations.

The integrated lens system 2 includes a plurality of layers 6-1-6-7 (generally, layers 6), some of which are optional. A reflective layer 6-1 is configured to reflect images provided from the display device 4 to an eye of a user. The reflective layer 6-1 may comprise a coating on top of a transparent substrate layer 6-2, which comprises a see-through substrate of the integrated lens system 2. In some embodiments, the transparent substrate layer 6-2 may be a polycarbonate material, but the embodiments are not limited to any particular transparent substrate. In some embodiments, the transparent substrate layer 6-2 is a reflective optical surface made in accordance with mechanisms disclosed in U.S. Pat. No. 8,781,794 entitled "Methods and Systems for Creating Free Space Reflective Optical Surfaces" and U.S. Pat. No. 8,625,200 entitled "Head-Mounted Display Apparatus Employing One or More Reflective Optical Surfaces," the contents of both of which are incorporated herein by reference.

The integrated lens system 2 also includes an external light control layer, which in this embodiment comprises a photochromic layer 6-3. The transmissivity of the photochromic layer 6-3 changes in response to an amount of external light from a scene 7 that impinges upon the integrated lens system 2. Examples of a photochromic layer 6-3 include, by way of non-limiting example, a transition lens that automatically darkens in response to impingement of light. While for purposes of illustration and explanation the layers 6 are discussed separately, in practice, some of the layers 6 may comprise a single physical layer. For example the photochromic layer 6-3 and the transparent substrate layer 6-2 may be integrated with one another, and in practice comprise a single physical layer that provides both a suitable transparent substrate and a photochromic function. Similarly, the transparent substrate layer 6-2 and the reflective layer 6-1 may in practice comprise a single physical layer that provides both a suitable transparent substrate and suitable reflective properties.

Although FIG. 1 illustrates the photochromic layer 6-3 as being farther from the eye of the user than the transparent substrate layer 6-2, in other embodiments, the photochromic layer 6-3 may be positioned in between the transparent substrate layer 6-2 and the eye. An anti-reflective layer 6-4 inhibits reflections on the integrated lens system 2 and prevents double imaging caused by the reflection of a display into the user's eye. The anti-reflective layer 6-4 allows light to escape the transparent substrate layer 6-2 instead of being reflected back, which may result in every line appearing to be two lines. The anti-reflective layer 6-4 may be a coating that is applied to the photochromic layer 6-3 or, if the positions of the photochromic layer 6-3 and the transparent substrate layer 6-2 are switched, may be a coating that is applied to the transparent substrate layer 6-2.

While for purposes of illustration FIG. 1 illustrates the reflective layer 6-1, the transparent substrate layer 6-2, the photochromic layer 6-3 and the anti-reflective layer 6-4 as separate from one another, in practice each layer 6 is coupled to its adjacent layers, and together form the integrated lens system 2.

In some embodiments, the integrated lens system 2 may also include an anti-scratch layer 6-5 that is bonded, coated, or otherwise attached to the anti-reflective layer 6-4 to protect the external surface of the integrated lens system 2. The integrated lens system 2 may also include a protective layer 6-6 that is bonded, coated, or otherwise attached to the reflective layer 6-1, and an anti-fog layer 6-7 that is coupled to the protective layer 6-6 to keep the interior surface of the integrated lens 2, which may be in relatively close proximity to the user's face, from fogging.

In operation, external light 8 from the scene 7 is transmitted through the integrated lens system 2 and presented to the eyes of the user. In response to the amount of external light 8, the photochromic layer 6-3 automatically darkens (or lightens) to alter the transmissivity of the photochromic layer 6-3, thereby facilitating a strong contrast between the scene 7 seen by the user and that of the AR imagery provided by the display device 4 on the internal surface of the integrated lens system 2.

Figure 2:
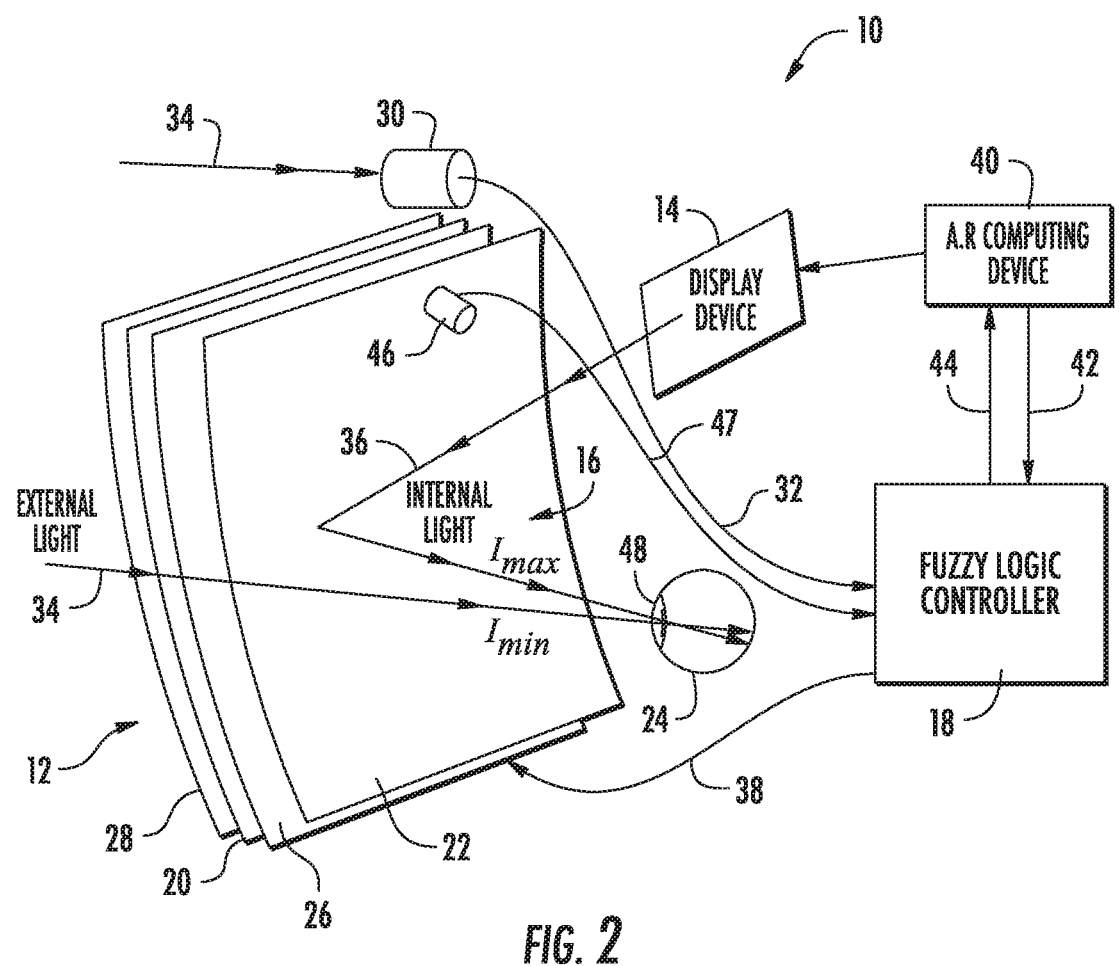
FIG. 2 is a diagram of an AR head-wearable device according to another embodiment.

FIG. 2 is a diagram of an AR head-wearable device 10 (hereinafter, AR device 10) according to another embodiment. The AR device 10 is substantially similar to the AR device 1 except as otherwise discussed herein. Again, the AR device 10 may include a frame structure that can be placed on the head of a user, such as one or more adjustable straps, or may include a frame structure that can be coupled to another device, such as a helmet. The AR device 10 includes an integrated lens system 12 that has a field of view (FOV), a display device 14 that is configured to present an image on an interior surface 16 of the integrated lens system 12, and a controller 18 communicatively coupled to the display device 14 and to an external light control layer, in this example an electrophotochromic layer 20, of the integrated lens system 12. In this example, the integrated lens system 12 includes four layers. A reflective layer 22 is configured to reflect images provided from the display device 14 to an eye 24 of a user. The reflective layer 22 may comprise a coating on top of a transparent substrate layer 26, which comprises a see-through rigid substrate of the integrated lens system 12. In some embodiments, the transparent substrate layer 26 may be a polycarbonate material, but the embodiments are not limited to any particular transparent substrate. The electrophotochromic layer 20 is a layer whose transmissivity may be altered by a control signal. Thus, the electrophotochromic layer 20 may be electrically controlled to adjust the amount of light of an external scene that is presented to the eye 24 of the user. As discussed above with regard to the AR device 1, in some embodiments, the transparent substrate layer 26 is a reflective optical surface made in accordance with mechanisms disclosed in U.S. Pat. Nos. 8,781,794 and 8,625,200.

Although FIG. 2 illustrates the electrophotochromic layer 20 as being farther from the eye 24 than the transparent substrate layer 26, in other embodiments, the electrophotochromic layer 20 may be positioned in between the transparent substrate layer 26 and the eye 24. An anti-reflective layer 28 inhibits reflections on the integrated lens system 12, and prevents double imaging caused by the reflection of a display into the user's eye. The anti-reflective layer 28 may be a coating that is applied to the electrophotochromic layer 20 or, if the positions of the electrophotochromic layer 20 and the transparent substrate layer 26 are switched, may be a coating that is applied to the transparent substrate layer 26. As discussed above with regard to the integrated lens system 2, the various layers 22, 26, 20 and 28 are discussed separately herein; however, in practice, some of the layers 22, 26, 20 and 28 may comprise a single physical layer. For example the electrophotochromic layer 20 and the transparent substrate layer 26 may be integrated with one another and, in practice, comprise a single physical layer that provides both a suitable transparent substrate and a photochromic function. Similarly, the transparent substrate layer 26 and the reflective layer 22 may in practice comprise a single physical layer that provides both a suitable transparent substrate and suitable reflective properties.

While for purposes of illustration FIG. 2 illustrates the reflective layer 22, the transparent substrate layer 26, the electrophotochromic layer 20 and the reflective layer 22 as separate from one another, in practice each layer 22, 26, 20 and 22 is coupled to its adjacent layers, and together form the integrated lens system 12.

The AR device 10 includes a light power sensor 30 that is configured to generate an external light power level 32 that corresponds to an amount of external light 34 received from a scene within the FOV. The external light power level 32 may be an analog or digital signal. The external light power level 32 may be quantified in any desired manner. In one embodiment, the quantification of the amount of external light 34 may be based on irradiance measured in watts per square meter, or may be based on luminosity measured in lumens, (candela/meter)$^2$, or in any other appropriate units.

The term "external light" in this context refers to light received from outside the AR device 10, in contrast to light generated by the AR device 10, such as internal light 36 generated by the display device 14. The internal light 36 is in the form of imagery provided to the display device 14 and presented by the display device 14. As will be discussed below in greater detail, in some embodiments the controller 18 may control the power level associated with such imagery. The display device 14 may comprise any suitable display device, such as a spatial light modulator, or the like.

The controller 18 may comprise any suitable control mechanism, including a processor device and memory, programmed to implement the functionality described herein. In some embodiments, the controller 18 may comprise a fuzzy logic controller that utilizes fuzzy logic to control various aspects of the AR device 10, as described in greater detail herein. Generally, the controller 18 utilizes one or more inputs to determine a control signal to send to the electrophotochromic layer 20 to alter the transmissivity of the electrophotochromic layer 20 in order to limit the amount of external light 34 that is presented to the eye 24 of the user. In one embodiment, the controller 18 utilizes the external light power level 32 to determine a control signal 38 that alters the transmissivity of the electrophotochromic layer 20. The controller 18 may generate the control signal 38 to ensure that the contrast between the external light 34 presented to the user and the light associated with an image generated by the display device 14 has a desired contrast ratio between the scene and the image. While solely for purposes of illustration the controller 18 is discussed herein as being a fuzzy logic controller, the embodiments are not limited to any particular type of controller.

The AR device 10 includes, or is communicatively coupled to, an AR computing device 40 that is responsible for generating AR imagery, and sending the AR imagery to the display device 14 for presentation on the interior surface 16 of the integrated lens system 12 for reflection into the eye 24 of the user. In some embodiments, the AR computing device 40 may determine an initial power level 42 associated with an image, and provide the initial power level 42 to the controller 18. The initial power level 42 may be quantified in any desired manner. In one embodiment, the initial power level 42 may be determined by the sum of the red, green, blue (RGB) values for each pixel image, multiplied by a constant related to the power of the display device 14, and multiplied by a ratio of the reflection size of the internal surface 16 to the size of the display device 14. Basically, any number of mechanisms may be used to determine the initial power level 42, so long as the formula is associated with how bright any particular image will be. In some embodiments, the determination may be based simply on a peak brightness of the brightest pixel in the image.

Based on the external light power level 32 of the external light 34, the controller 18 may determine a different power level 44 of the image, and provide the power level 44 to the AR computing device 40. The AR computing device 40 may then alter the image to meet the power level 44, such as by altering RGB values of the pixels of the image to increase or decrease the brightness of the image. The AR computing device 40 then sends the image to the display device 14.

In some embodiments, the electrophotochromic layer 20 comprises a voltage-controlled optical filter that has a control voltage that can be within a range between a lowest control voltage and a highest control voltage associated with the particular electrophotochromic layer 20. A lowest control voltage may correspond to a maximum transmissivity of the electrophotochromic layer 20, and a highest control voltage may correspond to a minimum transmissivity of the electrophotochromic layer 20. The controller 18 may attempt to maximize the contrast ratio of the internal light 36 to that of the external light 34 that is presented to the eye 24 of the user, while maintaining a level of brightness that is within the acceptable and optimum range for the eye 24. The contrast ratio may be defined as $$\text{Contrast} = \frac{I_{max} - I_{min}}{I_{max} + I_{min}}$$

where $I_{max}$ is the power level of the internal light 36 and $I_{min}$ is the external light power level 32 of the external light 34. In some embodiments, the AR device 10 includes a pupil measurement device 46 that is configured to determine a pupil size 47 of a pupil 48 of the eye 24. The AR device 10 may use the pupil size 47 of the pupil 48 to determine whether the combination of the internal light 36 and the external light 34 is within a desired "optimal" range. In such embodiments, the controller 18 may attempt to keep the internal light 36 and the external light 34 at a relatively constant level "$I_{opt}$" with the highest possible contrast ratio as the user wears the AR device 10 through different environmental lighting conditions. Thus, the AR device 10 may utilize measurements such as the external light power level 32 of the external light 34, the initial power level 42 of a next image to be presented on the display device 14 and the pupil size 47 to determine the control signal 38 and the power level 44 to both maintain a desired contrast ratio between the internal light 36 and the external light 34 and to maintain the total amount of the internal light 36 and the external light 34 within an "optimum" range.

It should be noted that these calculations, in operation, may be occurring continuously at a relatively rapid rate, such as 30, 60 or 120 frames per second. Thus, each $\frac{1}{120}^{th}$ of a second the controller may determine the current external light power level 32 of the external light 34, determine the current pupil size 47 from the pupil measurement device 46, and may be provided an initial power level 42 of a next image to be presented by the AR computing device 40 on the display device 14. In response, the controller 18 determines the appropriate control signal 38 and sends the control signal 38 to the electrophotochromic layer 20, and also determines the appropriate power level 44 of the image, and sends the power level 44 to the AR computing device 40. The AR computing device 40 alters the image as necessary to meet the power level 44, and sends the image to the display device 14. Moreover, while for purposes of illustration only a single display device 14 is illustrated, in some embodiments the AR device 10 includes two display devices 14, one for each eye 24 of the user.

Figure 3:
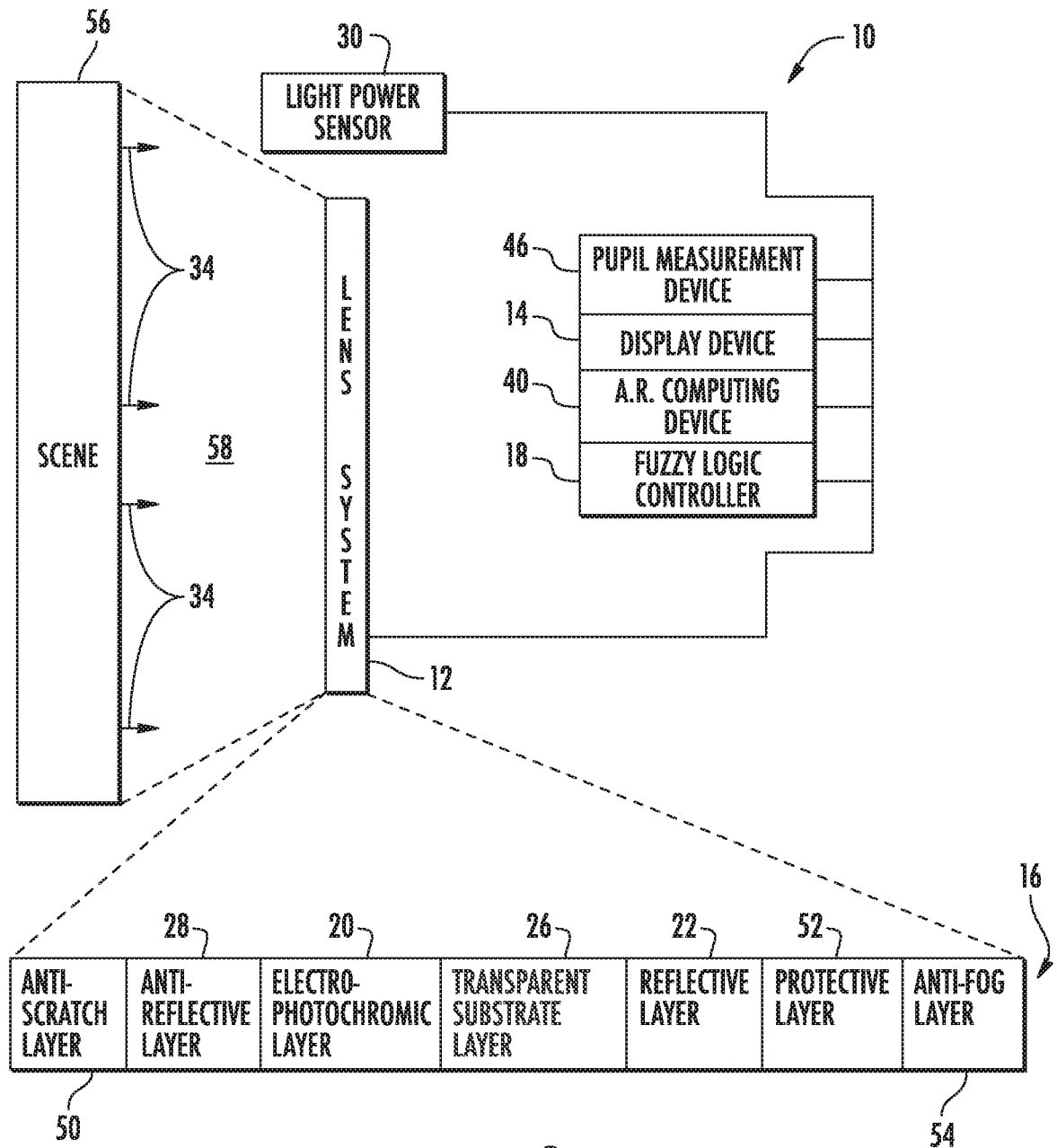
FIG. 3 is a block diagram of the AR device illustrated in FIG. 2 according to another embodiment.

FIG. 3 is a block diagram of the AR device 10 according to one embodiment. The AR device 10 includes the integrated lens system 12, the light power sensor 30, the controller 18, the AR computing device 40, the display device 14, and the pupil measurement device 46. In this example, the integrated lens system 12 also includes an anti-scratch layer 50 that is bonded, coated, or otherwise attached to the anti-reflective layer 28 to protect the external surface of the integrated lens system 12. The integrated lens system 12 also includes a protective layer 52 that is bonded, coated, or otherwise attached to the reflective layer 22, and an anti-fog layer 54 that is coupled to the protective layer 52 to keep the interior surface 16, which may be in relatively close proximity to a user's face, from fogging.

The light power sensor 30 receives external light 34 from a scene 56 within an FOV 58 of the lens system 12, and determines an external light power level 32 that quantifies the amount of external light 34 received from the scene 56. The scene 56 is transmitted through the integrated lens system 12, depending on the transmissivity of the electrophotochromic layer 20, to the eyes of the user. Note that the scene 56 continuously changes as the FOV 58 encompasses different scenes 56 in the real world as the user moves about the real world. Thus, the amount of external light 34 also continuously changes, and the light power sensor 30 continuously determines the external light power level 32 and provides the external light power level 32 to the controller 18. This may occur, for example, every 10 milliseconds, every 100 milliseconds, or at any other desired interval.

Figure 4:
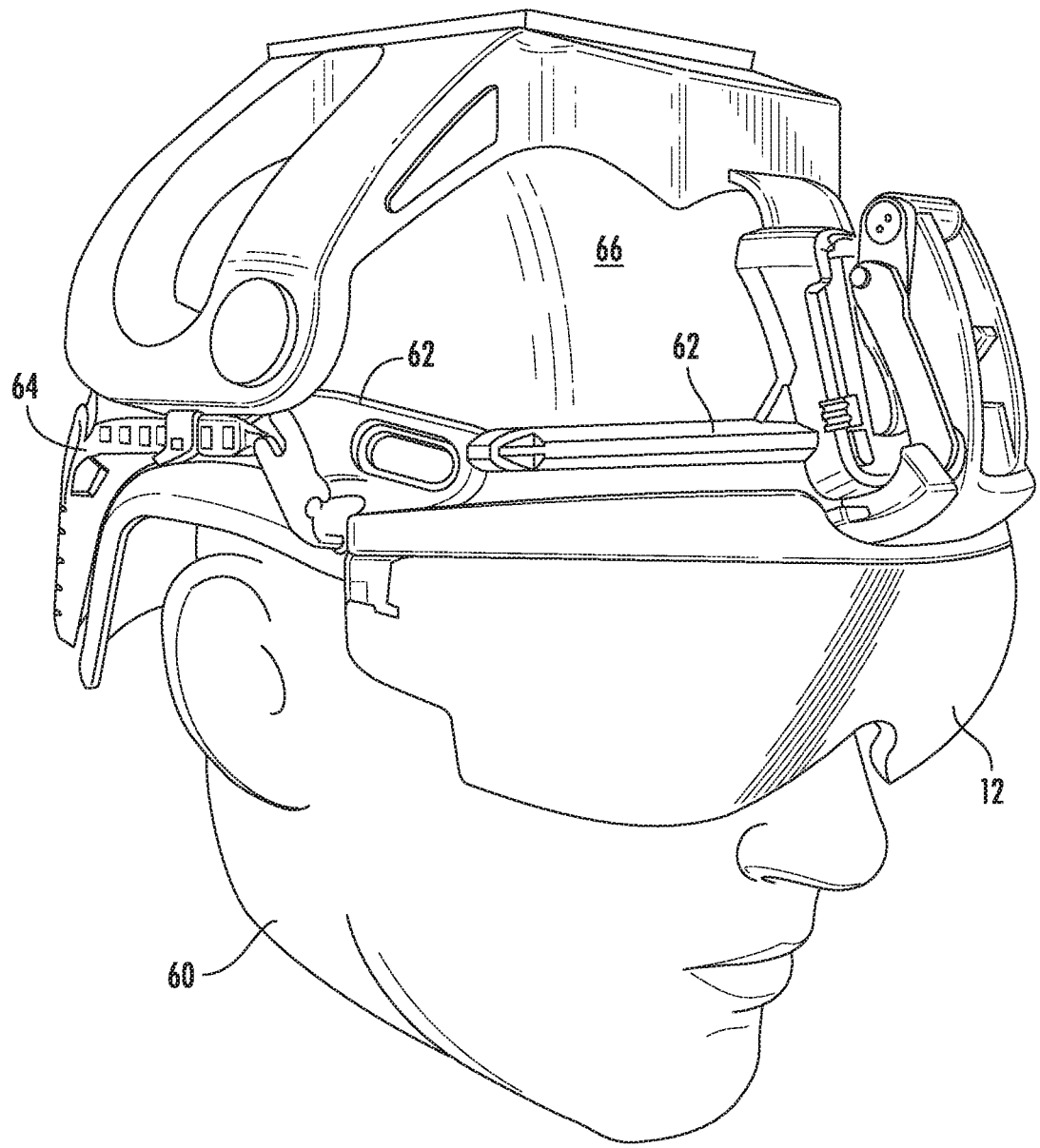
FIG. 4 is a perspective view of the AR device worn by a user according to one embodiment.

FIG. 4 is a perspective view of the AR device 10 worn by a user 60 according to one embodiment. In this embodiment, the AR device 10 includes a frame structure 62 that is configured to be attached to rail mounts 64 of a helmet 66. The integrated lens system 12, display device 14, pupil measurement device 46, and light power sensor 30 are all directly or indirectly attached to the frame structure 62. In this embodiment, two display devices 14 (not illustrated) are positioned behind the integrated lens system 12 and above the eyes of the user 60. The display devices 14 are oriented to present images to the interior surface 16 of the integrated lens system 12 that reflect, respectively, into the eyes of the user 60. Each of the controller 18 and the AR computing device 40 may also be directly or indirectly attached to the frame structure 62, or may be in wireless proximity of the display device 14, the light power sensor 30, and the pupil measurement device 46, and communicate with the display device 14, the light power sensor 30, and the pupil measurement device 46 wirelessly. It should be noted that the AR device 1 may be similarly configured to be coupled to the helmet 66.

Figure 5:
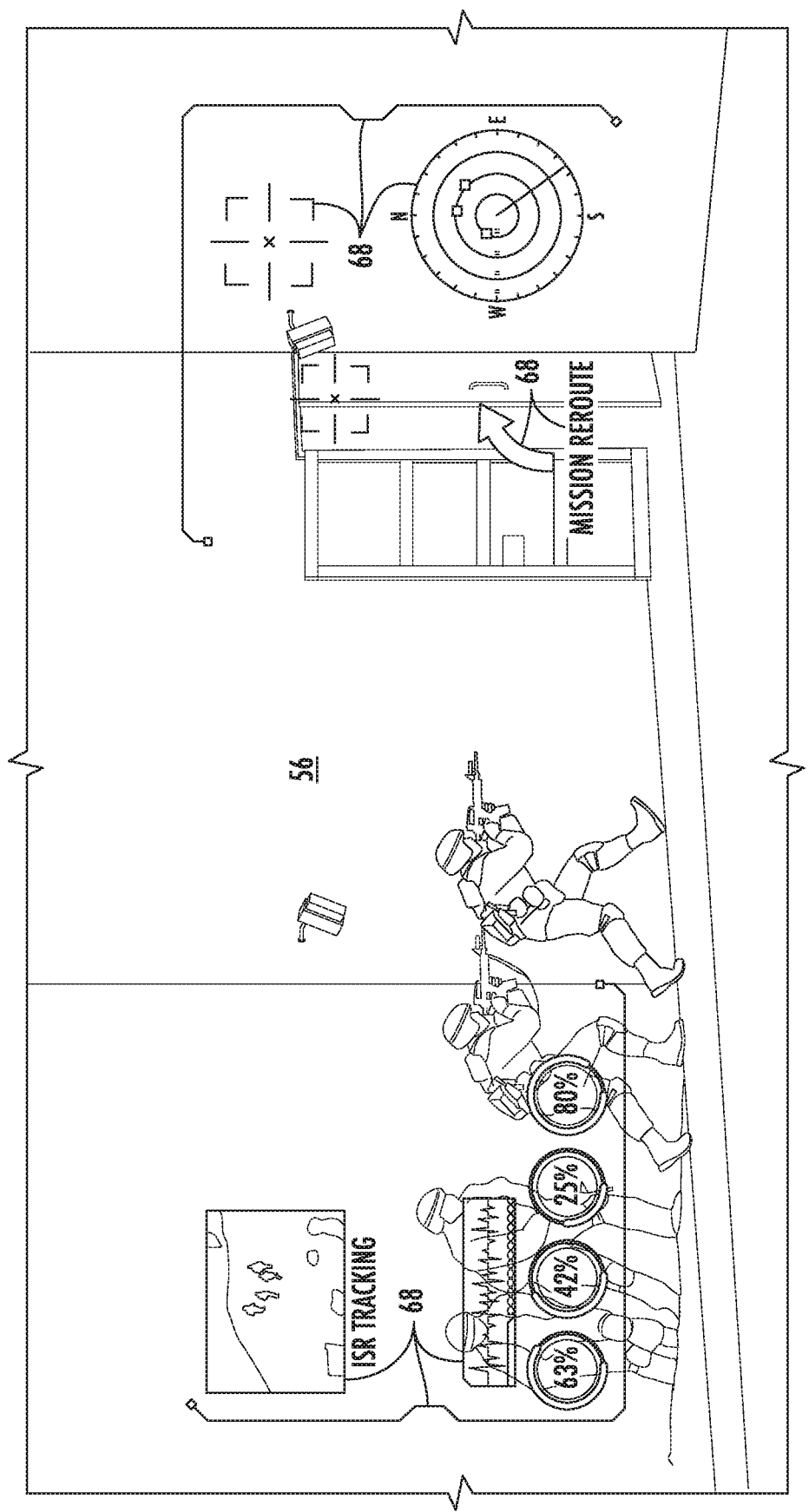
FIG. 5 is a perspective view of a scene and AR imagery that may be presented to a user at one particular instant in time, according to one embodiment.

FIG. 5 is a perspective view of a scene 56 and AR imagery 68 that may be presented to the user 60 at one particular instant in time. The AR imagery 68 is generated by the AR computing device 40 and presented on the interior surface 16 of the integrated lens system 12, and reflected into the eyes of the user 60, and is presented concurrently and in conjunction with the scene 56 seen by the user 60 through the integrated lens system 12. The image power of the AR imagery 68 is controlled by the controller 18 via the power level 44 (FIG. 2), and by the transmissivity of the electrophotochromic layer 20 via the control signal 38 based on the external light power level 32 to implement a desired contrast ratio between the scene 56 and the AR imagery 68, and in some embodiments, further based on a desired optimal total light power of the combined scene 56 and the AR imagery 68.

In some embodiments, the controller 18 comprises a fuzzy logic controller 18, and relies on fuzzy logic to determine the control signal 38. In one embodiment, wherein the AR device 10 utilizes only the external light power level 32 to generate the control signal 38, and does not alter the image power of the imagery presented on the display device 14, the fuzzy logic controls may be summarized in the following manner:

1 if externalLight is veryDark, THEN veryLow EPCFcontrol;
2 if externalLight is dark, THEN low EPCFcontrol;
3 if externalLight is medium, THEN medium EPCFcontrol;
4 if externalLight is bright, THEN high EPCFcontrol; and
5 if externalLight is veryBright, THEN veryHigh EPCFcontrol, where externalLight is the external light power level 32 and the EPCFcontrol is the control signal 38. In some embodiments, the external light power level 32 output by the light power sensor 30 is an analog signal that is digitized by the fuzzy logic controller 18. The fuzzy logic controller 18 may scale the value so that a maximum illumination is '1.0' and a minimum illumination is '0.0'.

Figure 6:
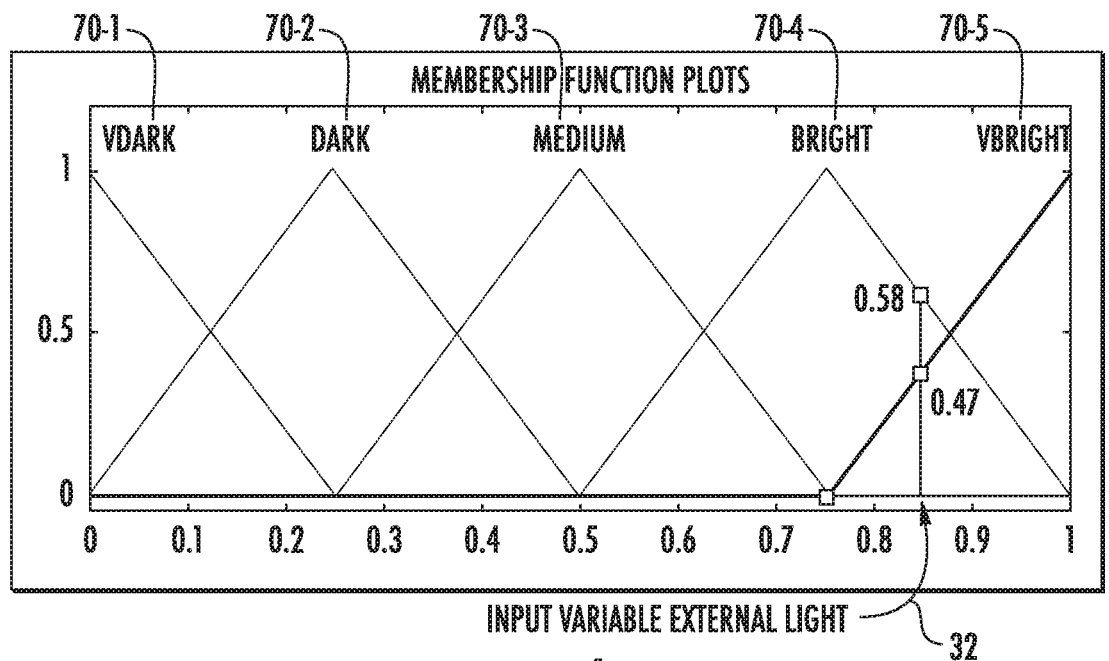
FIG. 6 illustrates membership function plots of five different fuzzy input membership functions according to one embodiment of a fuzzy logic controller.

FIG. 6 illustrates membership function plots of five different fuzzy input membership functions 70-1-70-5 according to one embodiment of the fuzzy logic controller 18. In particular, FIG. 6 illustrates fuzzy input membership functions for veryDark (Vdark) (70-1) through veryBright (Vbright) (70-5), and an input variable, external light power level 32, selecting a particular vertical line in the plot, which then defines what membership functions will be activated, and at what level. In this example, the external light power level 32 has a value of 0.85. FIG. 6 indicates that an external light power level 32 of 0.85 will implicate the "bright" input membership function 70-4 and the "very bright" (Vbright) input membership function 70-5.

Figure 7:
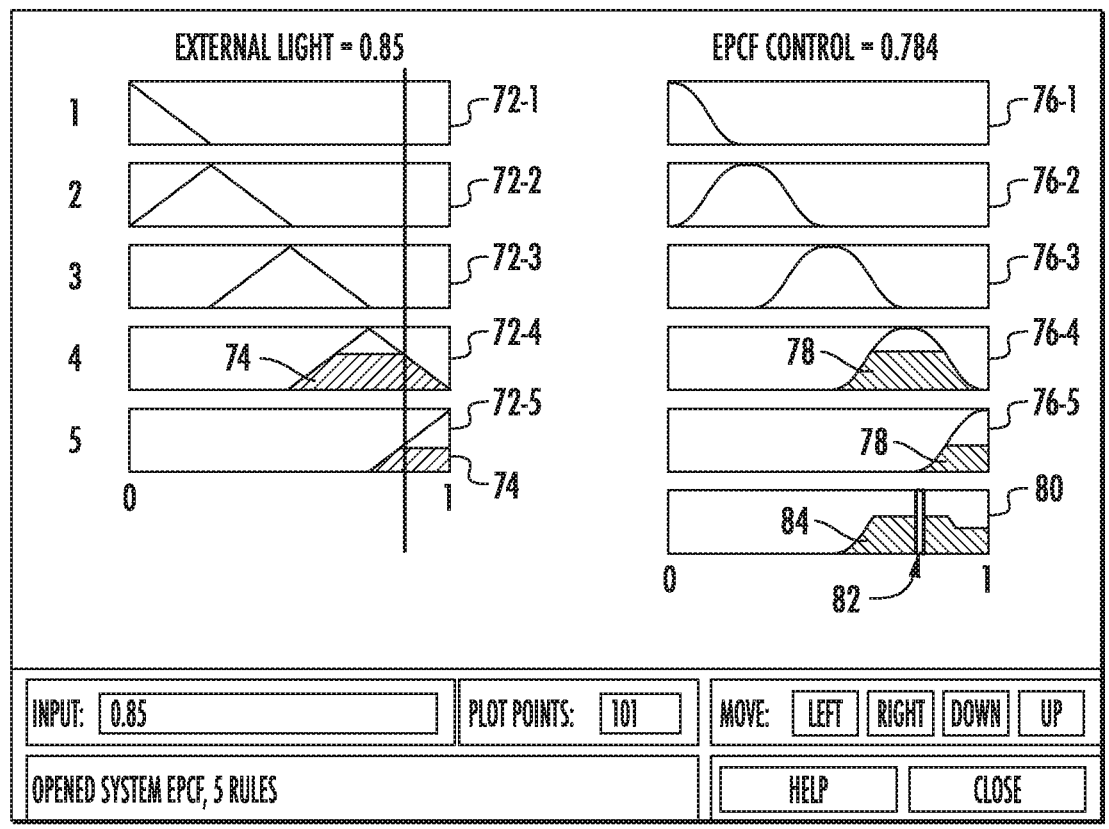
FIG. 7 illustrates plots associated with five fuzzy rules that correspond to the five different fuzzy input membership functions illustrated in FIG. 6, for use in determining an electrophotochromic control signal, according to one embodiment.

FIG. 7 illustrates plots associated with five fuzzy rules that correspond to the five different fuzzy input membership functions 70 illustrated in FIG. 6. The external light power level 32 enters the fuzzy logic membership plots to find the appropriate membership in each fuzzy logic membership function 70 and to find the final output. Five plots 72-1-72-5 on the left show the fuzzy input membership functions 70. The five plots 72-1-72-5 correspond, respectively, to the five different fuzzy input membership functions 70-1-70-5. For purposes of illustration, the fuzzy input membership functions 70 are simply triangles spread across a particular range of values of the external light power level 32, assigning an amount into each fuzzy input membership function 70.

In this example, fuzzy membership rules 4 (bright) and 5 (veryBright) are activated because the external light power level 32 falls into the ranges associated with fuzzy membership functions 4 and 5. The fuzzy membership rules map input membership functions to output membership functions. The amount that each fuzzy input membership function is activated is shown in cross-hatching 74. The consequents for the fuzzy membership functions are shown in the five plots 76-1-76-5 on the right side, which, in this example, have sigma-shaped membership functions. It is seen that the membership functions for the fuzzy membership rules 4 and 5 are activated as indicated by cross-hatching 78, to levels prescribed by the membership illustrated in plots 72-4 and 72-5. A plot 80 is the sum of all plots 76-1-76-5. A centroid 82 of the area 84 of the plot 80 is shown as having a value of 0.784, which is then used as the control signal 38 to alter the transmissivity of the electrophotochromic layer 20.

Thus, as the value of the external light power level 32 changes, different fuzzy input membership functions 70-1-70-5 will activate, resulting in a smoothly changing control signal 38.

Figure 8:
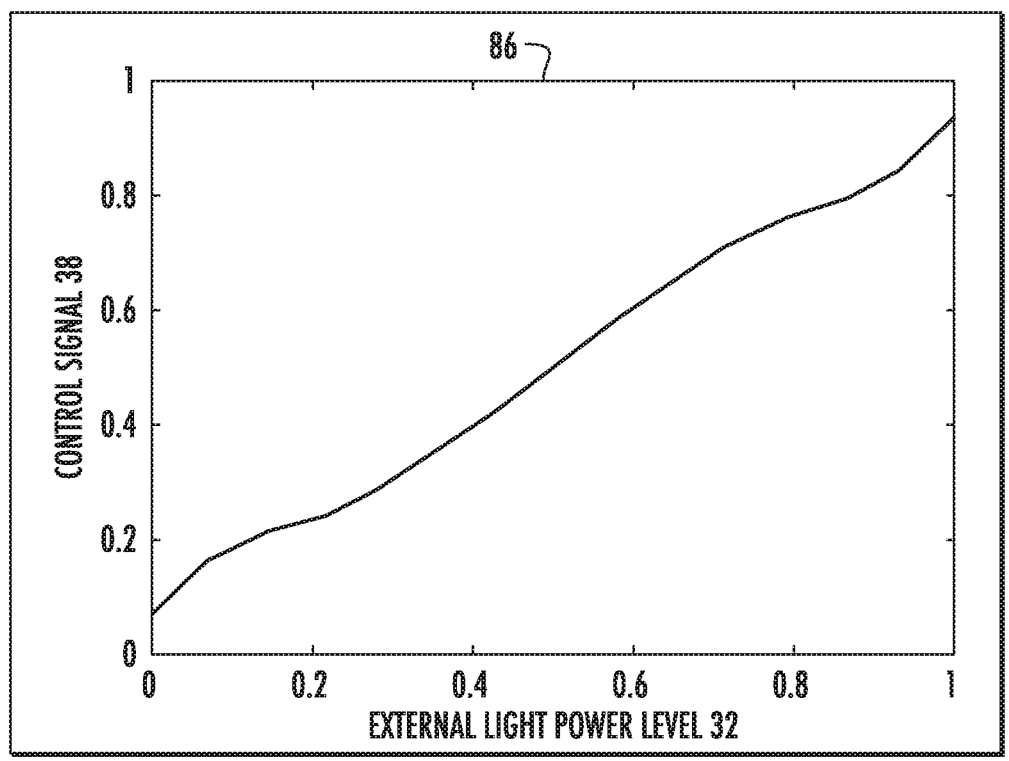
FIG. 8 is a graph illustrating an example mapping between an external light power level and a control signal according to one embodiment.

FIG. 8 is a graph 86 illustrating an example mapping between the external light power level 32 and the control signal 38 according to one embodiment.

In another embodiment the fuzzy logic controller 18 uses the external light power level 32 and the initial power level 42 of the image next to be presented on the display device 14, alters the image power of the next image to be presented on the display device 14, and ensures that the contrast ratio of the external light 34 from the scene 56 presented to the eyes of the user 60 and the light of the imagery being depicted on the internal surface 16 of the integrated lens system 12 stays within a desired range. In this embodiment, the contrast ratio may be represented as the ratio of the external light power level 32 to the image power level 44, although other mechanisms may be used. In this embodiment, the fuzzy logic controller 18 determines two outputs, the control signal 38 to set the transmissivity of the electrophotochromic layer 20 and the power level 44 to set the power level of the next image to be presented on the display device 14.

The fuzzy logic rules may then be summarized as:
1 if externalLight is veryDark AND imagePower is low, THEN veryLow EPCFcontrol AND low powerLevel;
2 if externalLight is veryDark AND imagePower is medium, THEN veryLow EPCFcontrol AND low powerLevel;
3 if externalLight is medium AND imagePower is medium, THEN medium EPCFcontrol AND medium powerLevel;
4 if externalLight is medium AND imagePower is low, THEN veryLow EPCFcontrol AND high powerLevel;
5 if externalLight is veryBright AND imagePower is medium, THEN veryHigh EPCFcontrol AND high powerLevel; and
6 if externalLight is veryBright AND imagePower is high, THEN veryHigh EPCFcontrol AND high powerLevel, where externalLight is the external light power level 32; EPCFcontrol is the control signal 38; imagePower is the initial power level 42; and powerLevel is the power level 44. In this example, the use of the two inputs, the external light power level 32 and the initial power level 42, results in two different plots, as illustrated in FIGS. 9A and 9B.

Figure 9A:
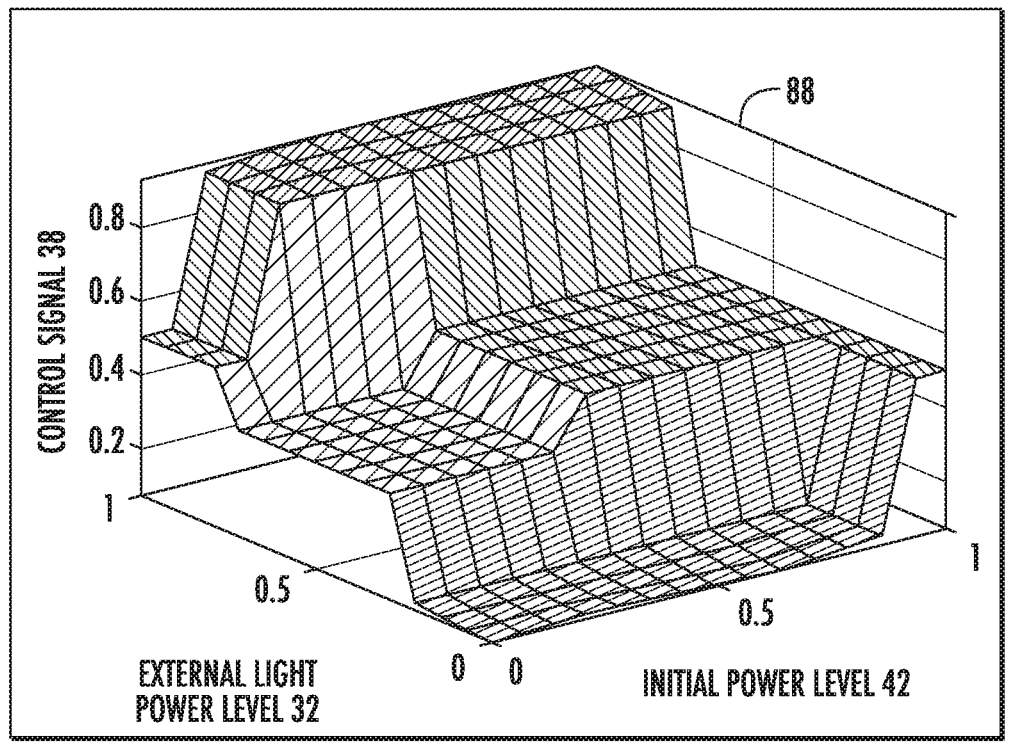
FIG. 9A is a plot that illustrates example values of a control signal given particular values of an external light power level and an initial power level of an image according to one embodiment.
Figure 9B:
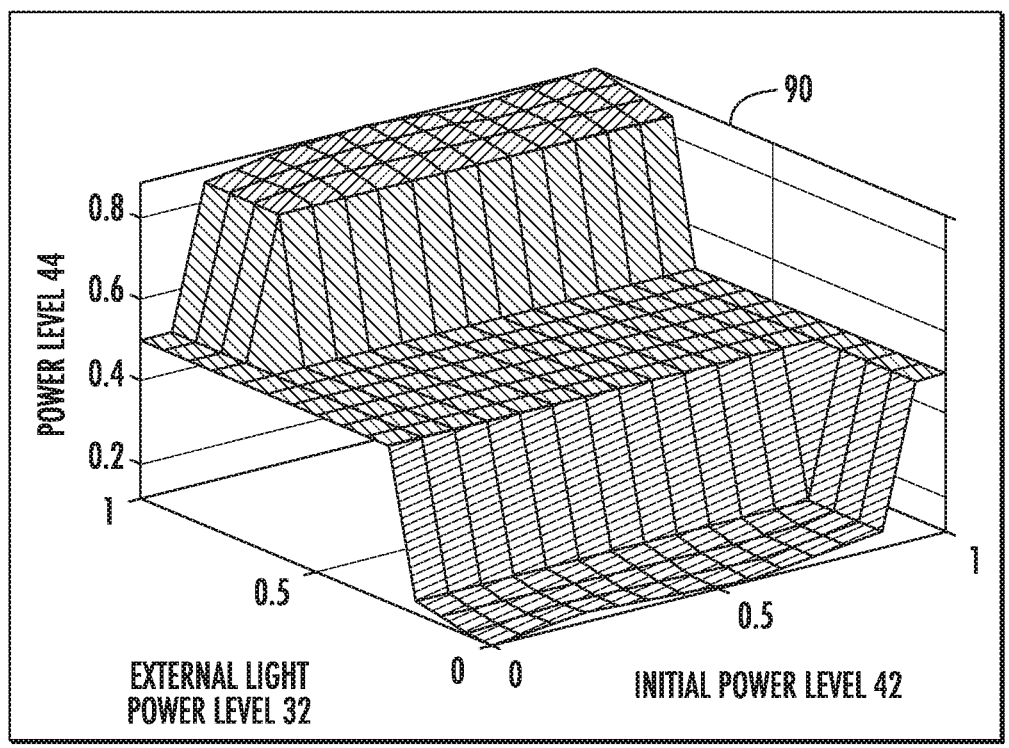
FIG. 9B is a plot that illustrates example values of a power level of an image given particular values of an external light power level and an initial power level of the image according to one embodiment.

FIG. 9A is a plot 88 that illustrates example values of the control signal 38 given particular values of the external light power level 32 and the initial power level 42. FIG. 9B is a plot 90 that illustrates example values of the power level 44 of the image given particular values of the external light power level 32 and the initial power level 42.

An external light power level 32 of 0.68, which is relatively high, and an initial power level 42 of 0.2, which is relatively low, results in an external control signal 38 of 0.3 and a power level 44 of 0.5. Thus, in this example, the transmissivity of the electrophotochromic layer 20 is lowered, and the power of the next image to be presented on the display device 14 is increased.

In other embodiments, the fuzzy logic controller 18 may utilize the pupil size 47, which may alter the determined external control signal 38 and power level 44. In one embodiment, the goal of the fuzzy logic controller 18 is to maintain the pupil size 47 at a nominal level. This aids in ensuring a safe light power level is provided to the eye.

In some embodiments, the fuzzy logic rules can be adjusted to be changed per user 60. Override fuzzy logic may be installed to maximize brightness, or for different operational modes. For example, if a user 60 is aware that they have important work to perform in a class that requires less outside light interference, the user can choose a mode that has different fuzzy logic rules.

Among other advantages, the AR device 10 dynamically maintains an optimized balance of external light to internal light under rapidly varying light conditions. The AR device 10 can thus be effectively used in a wide regime of operations. The rapid control and alteration of light transmission through the electrophotochromic layer 20, coupled with the feedback loop driven by the external light power sensor 30, and the internal light power level 44, facilitates optimizing the contrast ratio between the scene that is presented to the user 60 and the imagery that is concurrently presented to the user 60, to allow the AR imagery to be viewed reliably on a continuous basis in a wide array of external conditions.

Figure 10:
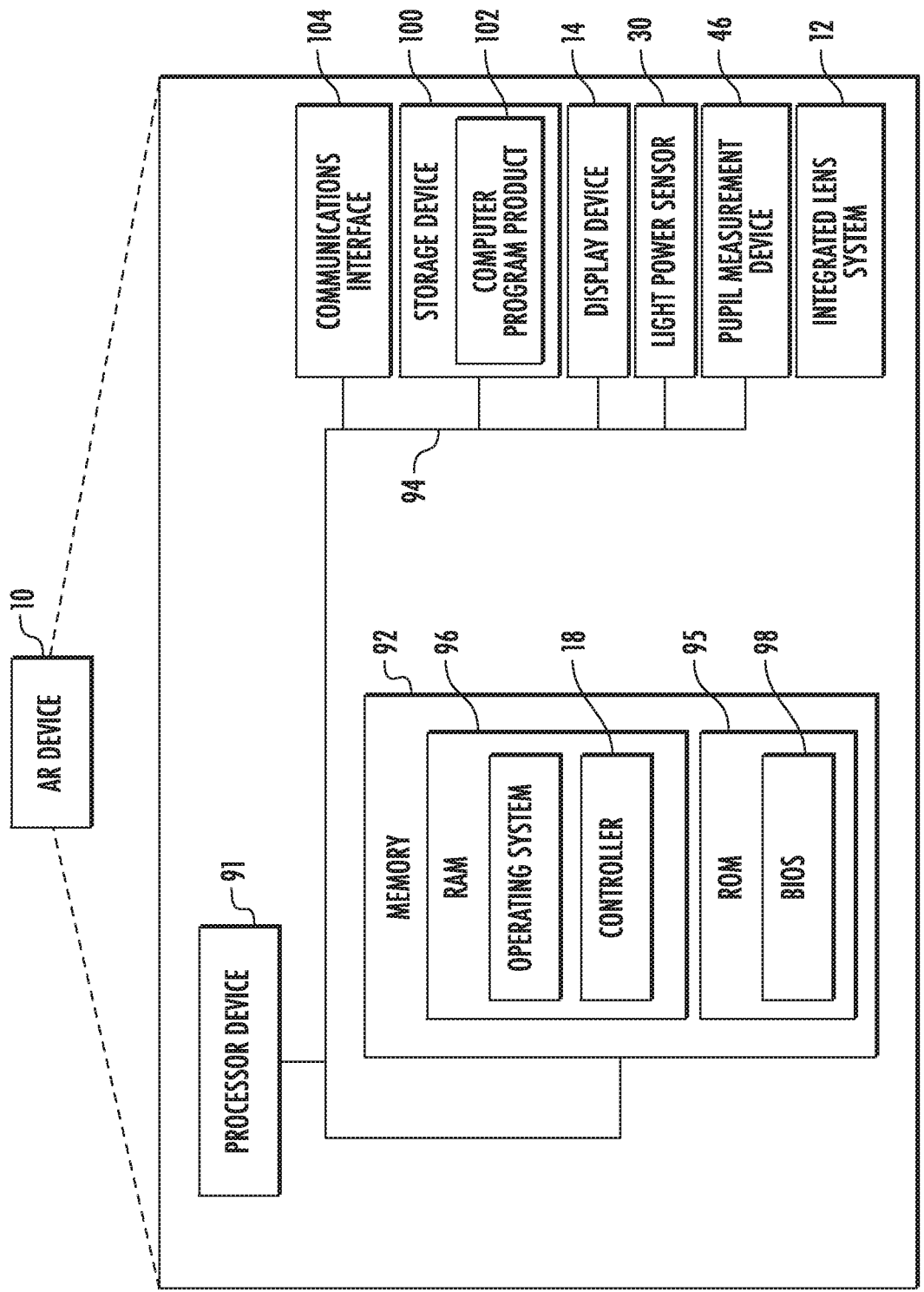
FIG. 10 is a block diagram of an AR device according to one embodiment.

FIG. 10 is a block diagram of the AR device 10 according to one embodiment. The AR device 10 includes a processor device 91, such as an Intel® or AMD® general purpose processing device, or may comprise a special purpose processing device. The AR device 10 includes a memory 92 and a system bus 94. The system bus 94 provides an interface for system components including, but not limited to, the memory 92 and the processor device 91.

The system bus 94 may be any of several types of bus structures that may further interconnect to a memory bus (with or without a memory controller), a peripheral bus, and/or a local bus using any of a variety of commercially available bus architectures. The memory 92 may include non-volatile memory 95 (e.g., read-only memory (ROM), erasable programmable read-only memory (EPROM), electrically erasable programmable read-only memory (EEPROM), etc.), and volatile memory 96 (e.g., random-access memory (RAM)). A basic input/output system (BIOS) 98 may be stored in the non-volatile memory 95 and can include the basic routines that help to transfer information between elements within the AR device 10. The volatile memory 96 may also include a high-speed RAM, such as static RAM, for caching data.

The AR device 10 may further include or be coupled to a non-transitory computer-readable storage medium such as a storage device 100, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 100 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples. A number of modules can be stored in the storage device 100 and in the volatile memory 96, including an operating system and one or more program modules, such as the controller 18, which may implement the functionality described herein in whole or in part.

All or a portion of the examples may be implemented as a computer program product 102 stored on a transitory or non-transitory computer-usable or computer-readable storage medium, such as the storage device 100, which includes complex programming instructions, such as complex computer-readable program code, to cause the processor device 91 to carry out the steps described herein. Thus, the computer-readable program code can comprise software instructions for implementing the functionality of the examples described herein when executed on the processor device 91.

The AR device 10 may also include a communications interface 104, such as an Ethernet transceiver or the like, suitable for communicating with a network, or the AR computing device 40, as appropriate or desired. The AR device 10 includes the display device 14, the light power sensor 30, the optional pupil measurement device 46, and the integrated lens system 12.

Those skilled in the art will recognize improvements and modifications to the preferred embodiments of the disclosure. All such improvements and modifications are considered within the scope of the concepts disclosed herein and the claims that follow.

What is claimed is:
1. A device comprising:
   an integrated lens system having a field of view (FOV), the integrated lens system comprising:
      a reflective layer;
      a transparent substrate layer;
      an external light control layer comprising an electrophotochromic layer; and
      an anti-reflective layer;
   a display device configured to present internal light representing augmented reality (AR) imagery on an interior surface of the integrated lens system for reflection into eyes of a user, the AR imagery generated based on an image power level determined and provided by an AR computing device;
   a light power sensor configured to generate a first external light power level quantifying an amount of light received from the scene within the FOV;
   a controller communicatively coupled to the electrophotochromic layer and to the display device, the controller configured to:
      receive, from the AR computing device, the image power level determined and provided by the AR computing device for generating the internal light of the AR imagery generated by the AR computing device;
      determine, using the first external light power level and the image power level determined and provided by the AR computing device, a control signal for adjusting a transmissivity of the electrophotochromic layer and a second internal light power level of the internal light presented by the display device;
      adjust the transmissivity of the electrophotochromic layer according to the control signal to control an amount of external light propagating from the scene to the eyes of the user via the integrated lens system; and
      adjust, according to the second internal light power level, a power level of the display device to control the amount of the internal light presented by the display device to the eyes of the user.

2. The device of claim 1, wherein the integrated lens system further comprises:
   an anti-scratch layer, wherein the anti-scratch layer is coupled to the anti-reflective layer;
   a protective layer coupled to the reflective layer; and
   an anti-fog layer coupled to the protective layer, wherein the anti-fog layer is configured to be positioned closer to the eyes of the user than the anti-scratch layer.

3. The device of claim 2, wherein:
   a first layer of the transparent substrate layer and the external light control layer are coupled to the reflective layer;
   a second layer of the transparent substrate layer and the external light control layer are coupled to the first layer; and
   the anti-reflective layer is coupled to the second layer.

4. The device of claim 1, wherein:
   a first layer of the transparent substrate layer and the electrophotochromic layer are coupled to the reflective layer;
   a second layer of the transparent substrate layer and the electrophotochromic layer are coupled to the first layer; and
   the anti-reflective layer is coupled to the second layer.

5. The device of claim 1, further comprising a pupil measurement apparatus to determine the size of a pupil of the user, wherein the controller is configured to determine the control signal and the second internal light power level further using the size of the pupil of the user.

6. The device of claim 1, wherein:
   the light power sensor is further configured to periodically generate the first external light power level that quantifies the amount of light received from the scene within the FOV;
   the display device is further configured to present a plurality of successive AR images on the interior surface of the integrated lens system over a period of time; and
   the controller is further configured to determine a separate control signal for each AR image of the plurality of successive AR images based on a current external light power level and respective image power level of each AR image.

7. The device of claim 1, wherein the controller is configured to determine the control signal and the second internal light power level by determining a desired contrast ratio between the scene and the AR imagery generated by the AR computing device, the desired contrast ratio defined in terms of external light power and internal light power.

8. The device of claim 7, wherein the desired contrast ratio is determined based on the following formula:

$$\text{Contrast ratio} \equiv \frac{I_{max} - I_{min}}{I_{max} + I_{min}},$$

wherein $I_{max}$ is an internal light power level that corresponds to the AR imagery and $I_{min}$ is an external light power level that corresponds to the light received from the scene within the FOV.

9. The device of claim 1, wherein the controller comprises a fuzzy logic controller, and wherein the fuzzy logic controller comprises a plurality of membership functions, each membership function associated with a range of external light power level values, and wherein the fuzzy logic controller determines the control signal based at least in part on particular membership functions that are activated in response to the first external light power level and the image power level.

10. The device of claim 1, wherein the integrated lens system further comprises:

an anti-scratch layer, wherein the anti-scratch layer is coupled to the anti-reflective layer;

a protective layer coupled to the reflective layer; and an anti-fog layer coupled to the protective layer, wherein the anti-fog layer is configured to be positioned closer to the eyes of the user than the anti-scratch layer.

11. The device of claim 1, further comprising a frame structure, and wherein the integrated lens system and the display device are coupled to the frame structure, the display device being coupled to the frame structure at an orientation to display one or more images on the interior surface of the integrated lens system.

12. The device of claim 11, further comprising a pupil measurement apparatus configured to determine a size of a pupil of the user, and wherein the pupil measurement apparatus is coupled to the frame structure.

13. The device of claim 1, wherein the integrated lens system transmits light received from outside the integrated lens system toward the eyes of the user, and reflects images generated by the display device and projected onto the interior surface of the integrated lens system toward the eyes of the user.

* * * * *